(No Model.) 2 Sheets—Sheet 1.

M. BROCK.
FILLING APPARATUS FOR NAILING MACHINES.

No. 537,270. Patented Apr. 9, 1895.

Witnesses
Fred S. Greenleaf
Thomas F. Drummond

Inventor
Matthias Brock
by Crosby & Gregory
Attys.

(No Model.) 2 Sheets—Sheet 2.

M. BROCK.
FILLING APPARATUS FOR NAILING MACHINES.

No. 537,270. Patented Apr. 9, 1895.

Witnesses.
Fred S. Greenleaf
Thomas P. Drummond

Inventor
Matthias Brock
by Crosby & Gregory
attys.

UNITED STATES PATENT OFFICE.

MATTHIAS BROCK, OF BOSTON, MASSACHUSETTS, ASSIGNOR TO THE McKAY-COPELAND LASTING MACHINE COMPANY, OF PORTLAND, MAINE.

FILLING APPARATUS FOR NAILING-MACHINES.

SPECIFICATION forming part of Letters Patent No. 537,270, dated April 9, 1895.

Application filed July 7, 1894. Serial No. 516,818. (No model.)

*To all whom it may concern:*

Be it known that I, MATTHIAS BROCK, of Boston, county of Suffolk, State of Massachusetts, have invented an Improvement in Filling Apparatus for Nail-Driving Mechanism, of which the following description, in connection with the accompanying drawings, is a specification, like letters and numerals on the drawings representing like parts.

In the manufacture of boots and shoes and other articles and for other purposes wherein it is desired to drive quickly loose nails, it has been customary to combine with a nail driving mechanism a race-way which is provided with a series of loose nails, and these nails have to be supplied to the race-way, and for this purpose machines have been devised. I have aimed to provide a simple and effective apparatus for this purpose. Heretofore the hoppers used in some forms of this class of apparatus have had permanently attached race-ways extended therefrom, and the race-ways of the nail driving apparatus or tools to be filled have been coupled temporarily to said permanent race-ways, and suitable gates or devices have been employed between the race-ways of the filling apparatus and of the nailing apparatus to permit or to prevent the passage of nails from one to the other.

In accordance with my invention, I provide a hopper, the open front end of which rests close to a plate provided with an opening, through which may be passed into the hopper the upper end of the race-way of the nailing apparatus, and with said apparatus I have combined a support or carrier, herein shown as a lever or arm adapted to be moved up or down to insure the entrance of the receiving end of the race-way of the nailing apparatus into, or its withdrawal from the end of the hopper, the movement of said lever or arm in this instance of my invention, up or down, also automatically effecting the starting or the stopping of the devices of the hopper which lifts the nails, and consequently controlling the times of feeding the nails from the hopper to the race-way.

Figure 1:
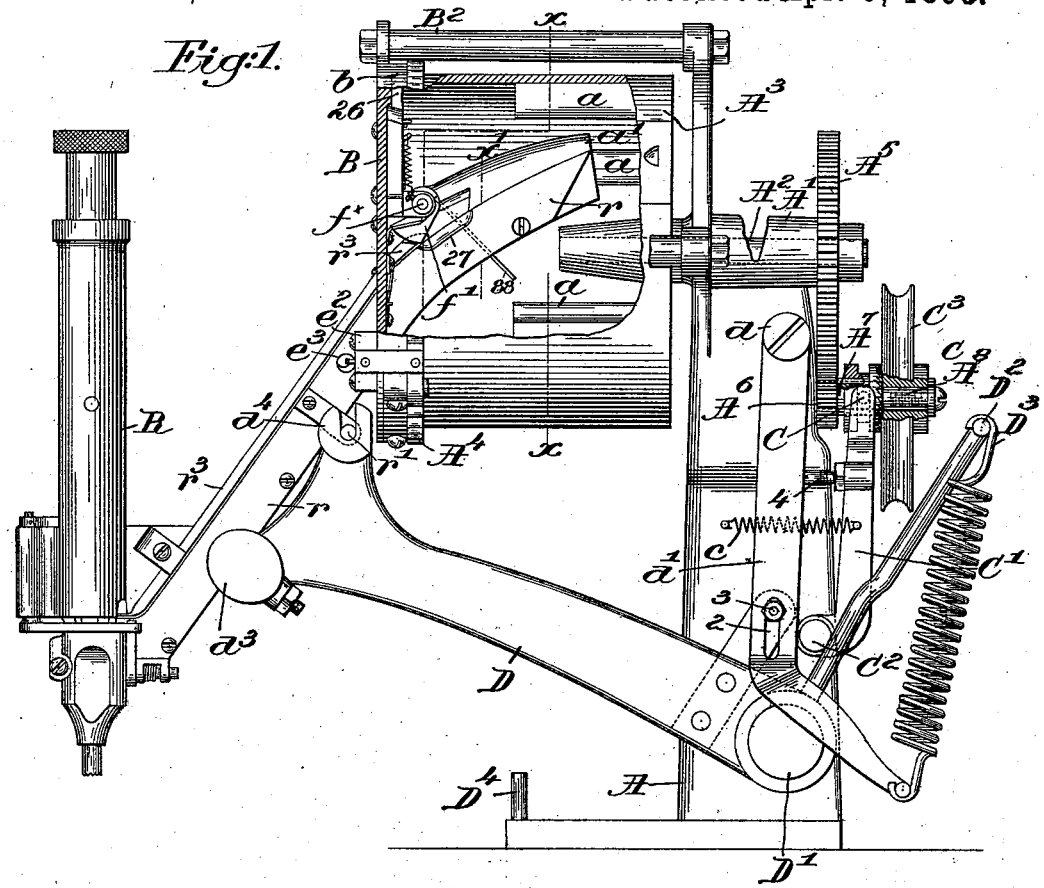
Figure 2:
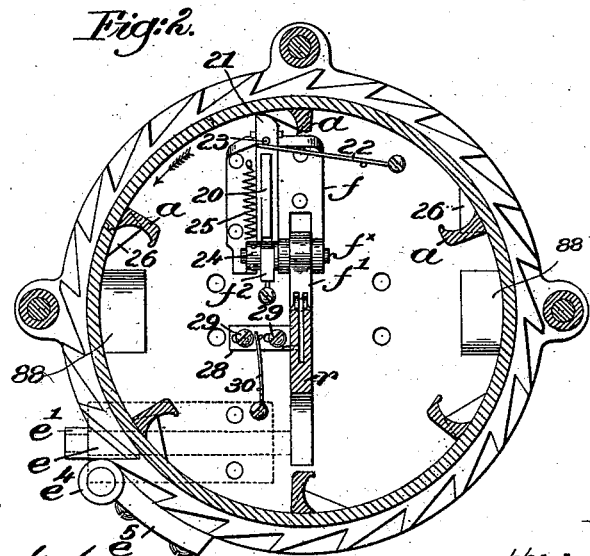
Figure 4:
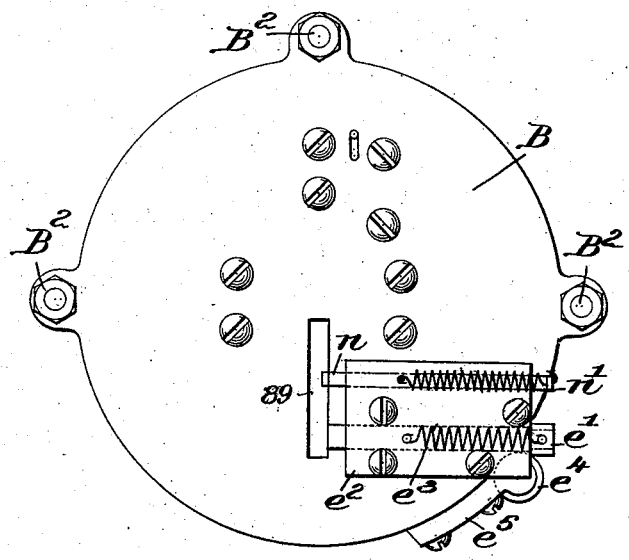
Figure 3:
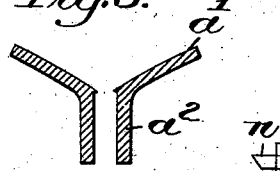
Figure 6:
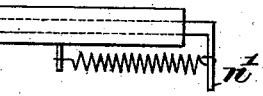
Figure 5:

Figure 1, in side elevation, shows a filling apparatus embodying my invention, together with a nailing apparatus having its raceway projected therein, the hopper being partially broken out to show the parts contained therein, one of the wings forming the apron above the race-way being omitted, part of the plate at the front end of the hopper being also broken away. Fig. 2 is a partial section in the line $x-x$, Fig. 1, looking to the left, the race-way being shown in section, but at a point nearer the end plate, the apron above the race-way being entirely omitted. Fig. 3 is a section of the apron or wings $a'$ in about the line $x'$ Fig. 1, together with a part of the race-way. Fig. 4 is a partial front view of the end plate. Fig. 5 is a detail showing the dog $f^2$; and Fig. 6, a detail showing the locking device for the race-way.

The frame A is and may be of any suitable shape to sustain the working parts, it having at its upper end a suitable bearing $A'$ in which is mounted to turn the shaft $A^2$ upon which is fixed the hopper $A^3$, it being supposed to be a cylinder open at its outer end and as having at its side a suitable door which may be removed when it is desired to supply the hopper with nails, said hopper having a series of nail lifting devices shown as shelves $a$ which carry the nails up and drop them upon the upper end of an apron, see Fig. 3, composed of two like inclined wings $a'$ having side flanges $a^2$ between which passes the upper end of the race-way $r$, connected with the nail driving apparatus R which may be of any usual or suitable construction, the particular apparatus herein shown being made the subject of another application, Serial No. 516,817, filed by me on the 7th day of July, 1894. The open top edge of the race-way $r$ when in the position shown in Fig. 1 comes into the space between the wings $a'$, so that the nails dropped by the lifting devices or shelves $a$ onto the said wings roll into the slot in the race-way. The hopper has fixed to it at or near its outer or left-hand open end, see Fig. 1, a series of ratchet teeth $A^4$, and the extreme end of the hopper preferably enters within a flange $b$ of an end plate B, the latter having a suitable opening 89, through which the race-way may be moved as it is being put into or withdrawn from the hopper. The shaft $A^2$ of the hopper has fast upon it a toothed gear $A^5$, which is engaged by a pinion $A^6$ fast to a sleeve $A^7$ mounted loosely on a stud $A^8$, said sleeve having an annular groove which is entered by a pin C at the upper end of a shipper lever $C'$, pivoted at $C^2$, the end of said sleeve having a series of clutch teeth, as shown in Fig. 1, adapted to be engaged by like clutch teeth fast to the driving pulley $C^3$ also loosely mounted on said stud $A^8$ and driven from any suitable source. The lever $C'$ is normally kept toward the frame-work by a suitable spring or device c, shown partially in Fig. 1, said spring keeping the clutch teeth of the sleeve out of engagement with the clutch teeth of the continuously rotating pulley $C^3$.

I have mounted upon the frame-work at d an actuating lever $d'$, herein shown as slotted at 2 to receive a roller or other stud 3 attached to an arm 34 of the support or carrier D for the nailing apparatus R, said support or carrier being herein shown as a lever or arm having its pivot upon a stud $D'$ fixed to the frame-work, and having extended from it an arm $D^2$, to which is connected one end of a strong spring $D^3$, the opposite end of said spring in this instance of my invention being shown as attached to the lower end of the lever $d'$. The outer end of the support or carrier is shown as provided with suitable ears $d^3$, between which is placed a part of the race-way r, and above said ears are other ears $d^4$ which are slotted to receive suitable studs or projections $r'$ extended from ears or plates, herein shown as connected to the race-way, thus enabling the race-way to be hung quickly upon the carrier when the latter is turned down, so that its under edge rests on the stop $D^4$, the rear edge of the lever $d'$ at such time being out of contact with the adjustable stop 4, shown as attached to the shipper lever, the clutch teeth before referred to at such time being also disengaged.

Now, if a race-way is to be filled, the operator will lay the race-way into the carrier and will move or lift the carrier, causing the upper end of the race-way to be passed through the opening 89 adapted for that purpose, and into the hopper in the position shown in Fig. 1, and at the same time the rear edge of the lever $d'$ will strike the stop 4 and will move the shipper lever, causing the clutch teeth on the sleeve $A^7$ to engage the clutch teeth of the rotating driving pulley $C^3$ and thus start the hopper immediately into operation, the lifting of nails to enter the race-way continuing until the operator removes the race-way of the nailing apparatus, the carrier D at such time being pulled down against the stop $D^4$, which movement as before stated, will stop the rotation of the hopper.

The shape of the lever $d'$ and the location of the arm $D^2$ connected to the carrier, and the position of the spring $D^3$ are such that the said spring by the upper end of the arm $D^2$ changing its position with relation to the center of motion of the carrier, serves to retain the carrier in each of its extreme positions.

The ratchet teeth $A^4$ referred to act against a web-shaped toe e connected to a frame $e'$, shown partially in Fig. 4, it sliding in a guide-way $e^2$ secured to the plate B, a suitable spring $e^3$ serving to keep the toe e in the path of movement of the said ratchet teeth. This frame $e'$ constitutes a hammer and its inner end is made to strike a series of blows in quick succession against the said race-way to thus keep in agitation and in motion the nails traveling down therein.

To overcome friction in the motion of the hammer contrivance I have provided the frame-work with a suitable anti-friction roller $e^4$, shown in Fig. 2 as upon a stand $e^5$ suitably fixed to the frame-work. The end-plate has secured to its inner side a stand f, having bearings for a rock-shaft $f^\times$ upon which is mounted a clearer $f'$, herein shown as of segmental shape and slotted at its edge next the top of the race-way, as shown best in Fig. 2, said clearer having imparted to it a vibrating or oscillating motion close to the top of the race-way, so as to knock off any nails which may be lodged cross-wise thereon or pull up and out any nails which are but partially in place. This rock-shaft $f^\times$ has attached to it at one end a dog $f^2$, shown separately in Fig. 5, it having an arm which is acted upon by a pawl 20 attached to a slide bar 21, normally held up by a spring 22, said spring acting against a pin 23 of said bar, the latter being of dove-tail or equivalent shape and entering a correspondingly shaped groove in the stand f. The rock-shaft $f^\times$ has also connected to it the hub of an arm 24, to which is connected a spring 25 attached at its opposite end, as herein shown, to a pin secured to the stand f, said spring 25 normally acting to keep the clearer in the position shown in Fig. 1, the downward motion of the slide causing the pawl to act on the bottom of the dog and swing the clearer upwardly along the race-way. The upper end of the slide bar, see Fig. 2, is rounded or made cam shaped and is acted upon and depressed intermittingly by a series of cams 26 attached to the hopper.

The race-way near its upper end has its side walls cut away as at 27, see Fig. 1, and co-operating with that part of the race-way is a stripper 28, shown best in Fig. 2 as a bar adapted to slide upon studs 29, said stripper having a finger or point represented by dotted lines which stands normally in the space between the upper side of the race-way and the cover $r^3$ thereof.

The upper end of the cover of the race-way as the latter arrives in its filling position in the hopper meets the end of the stripper and pushes it back against its operating spring 30, and thus removes the point or finger of the stripper out of the space between the race-way and its cover plate, so that the nails which pass the clearer travel down the raceway. The race-way having been filled the operator will depress the support or carrier D and in doing so as soon as the end of the cover plate retires from the stripper, the latter, operated by the spring 30, will cause the finger or projection of the stripper to pass sufficiently across the race-way to contact with the nails therein, and in the farther outward movement of the race-way the nails at the upper end thereof will be stripped out, thus preventing any liability of wasting the nails lodged by the hopper at the extremity of the race-way.

The plate B is herein shown as held in position by suitable stud screws $B^2$ supported at one end by the frame-work.

The interior of the hopper is provided with one or more diagonal plates 88, shown best in Figs. 1 and 2, which, in the rotation of the hopper act to gradually force the bulk of the nails toward the rear end thereof, thus insuring better distribution of the nails. The end plate is shown as provided with a race-way locking device, represented as a bolt $n$ having a handle $n'$ and operated by a spring, the end of said bolt snapping into a suitable notch in the side of the race-way, and aiding in keeping the inner end of the race-way in proper position within the hopper during the operation of filling the race-way.

This invention is not limited to the particular shape shown for the support or carrier, as I believe that I am the first to provide a hopper with an opening into which may be introduced the end of the race-way of a nail-driving apparatus to be filled, and then withdraw the same from the hopper, and consequently the first to mount a race-way of a nailing apparatus upon any sort of a support or carrier.

As I have illustrated my invention, when the nail-driving apparatus is set on the lever or arm D and the latter is lifted, the race-way will be directed into a hopper, so that said race-way may be filled with nails, and it may then be entirely withdrawn from the hopper by a reverse movement of the lever.

This invention is not limited to the exact shape shown for the race-way, although to enable the same to operate most effectually with the lever carrying it, it should be convex at its upper end to correspond with a curve struck from the center of motion of the lever.

This invention is not limited to the exact shape shown for the clutch mechanism and instead of the particular clutch mechanism shown or the particular actuating devices between it and the said carrier, I may employ any other suitable or equivalent devices.

This invention is not limited to pivoting the carrier, or to making the same as a lever adapted to move about a stud as its pivot, and instead I may make the race-way supporting part of said carrier movable in any suitable manner toward and from the opening 89 which enables the end of the race-way to enter the hopper or to retire from said hopper after it has been suitably filled.

Having described my invention, what I claim, and desire to secure by Letters Patent, is—

1. A filling apparatus for nailing machines, comprising a race-way, a hopper provided with an opening at one end and having nail-lifting devices, a clutch pulley to actuate the hopper to lift the nails and drop them into said race-way when the latter is temporarily inserted in said hopper, a carrier for said race-way to insert it into and remove it from the said hopper, and a connecting medium between the clutch-pulley and the race-way carrier, actuated to cause the hopper to start by the movement of the race-way carrier when the latter projects the race-way into the hopper, and to cause the hopper to stop when the race-way is withdrawn by its carrier, substantially as described.

2. In a filling apparatus for nailing machines, a rotatable hopper open at one end, a fixed end plate therefor, a movable race-way adapted to be inserted into and withdrawn from said hopper through an opening in said end plate, the said race-way having a lateral recess to receive a nail stripper which is movable across said race-way, combined with said stripper, a spring normally tending to project it across the race-way, and a race-way cover-plate interposed in the path of movement of the stripper, so that when the race-way is being introduced into the hopper, said cover-plate will withdraw the stripper, and when the race-way is being withdrawn from the hopper the cover-plate will recede from the stripper and permit its spring to project it into the race-way and remove therefrom back into the hopper all nails with which it meets, substantially as described.

3. In a filling apparatus for nailing machines, a hopper, and a race-way movable into and from said hopper, combined with an automatic stripper interposed in the path of movement of said race-way to deprive it of surplus nails as it is withdrawn from the hopper, substantially as described.

4. In a filling apparatus for nailing machines, the rotary hopper, the gear $A^5$ attached to its shaft, a driving shaft having a pinion in mesh with said gear, a driving pulley loose on said shaft, a clutching-mechanism to engage said pulley to turn with said shaft, a race-way for discharging the nails from said hopper, a movable carrier for said race-way to project it into and remove it from said hopper, a shipper for said clutching-mechanism, and means interposed between said shipper and said carrier to operate the shipper simultaneously with the operation of the carrier, substantially as described.

5. In a filling apparatus for nailing machines, the rotary hopper, the gear $A^5$ attached to its shaft, a driving shaft having a pinion in mesh with said gear, a driving pulley loose on said shaft, a clutching-mechanism to engage said pulley to turn with said shaft, a race-way for discharging the nails from said hopper, a movable carrier for said race-way to project it into and remove it from said hopper, a spring to retain said carrier in its extreme position, a shipper for said clutching-mechanism, and means interposed between said shipper and said carrier to operate the shipper simultaneously with the operation of the carrier, substantially as described.

In testimony whereof I have signed my name to this specification in the presence of two subscribing witnesses.

MATTHIAS BROCK.

Witnesses:
GEO. W. GREGORY,
M. J. SHERIDAN.